United States Patent [19]

Wu

[11] 4,044,847
[45] Aug. 30, 1977

[54] WEIGHING SYSTEM WITH A MOIRE OPTOELECTRONIC TRANSDUCER

[75] Inventor: Bosco Wu, Trumbull, Conn.
[73] Assignee: Pitney-Bowes, Inc., Stamford, Conn.
[21] Appl. No.: 653,850
[22] Filed: Jan. 30, 1976
[51] Int. Cl.$^2$ .................. G01G 3/00; G01G 23/36
[52] U.S. Cl. .................. 177/210 R; 177/DIG. 6; 250/237 G; 356/169
[58] Field of Search .................. 177/210 R, DIG. 6; 250/237 G, 231 R; 356/169

[56] References Cited

U.S. PATENT DOCUMENTS

| 3,586,665 | 6/1971 | Weyrauch | 250/237 G X |
|---|---|---|---|
| 3,815,125 | 6/1974 | May | 250/237 G X |
| 3,867,037 | 2/1975 | Litke | 356/169 |
| 3,923,110 | 12/1975 | Dan | 177/210 R |

*Primary Examiner*—Joseph W. Hartary
*Attorney, Agent, or Firm*—Robert S. Salzman; William D. Soltow, Jr.; Albert W. Scribner

[57] ABSTRACT

A weighing scale includes an optoelectronic system having apparatus for generating a moire fringe pattern and for detecting the moving of the pattern in accordance with scale tare deflection. One of a pair of ruled parallel grating sets is fixed with respect to the scale frame while the other is mounted for movement with the tare and close to and in a plane parallel with the fixed set. When a beam of light is projected through both grating sets in a transmissive mode towards a photodetector array the grating interference modulates the light beam into parallel moire fringes. Upon placement of a load on the scale, deflection of the tare results in movement of successive fringes across the photodetectors resulting in the sequential generation of weight indicative signals. The photodetectors are arrayed on and secured to a movable carrier which is adjustably positionable so that the effective spacings between the photodetectors corresponds to the spacings and proper phase angle required between said fringes.

9 Claims, 6 Drawing Figures

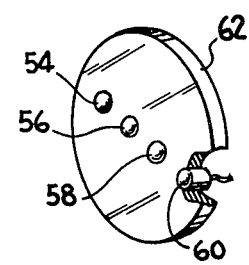
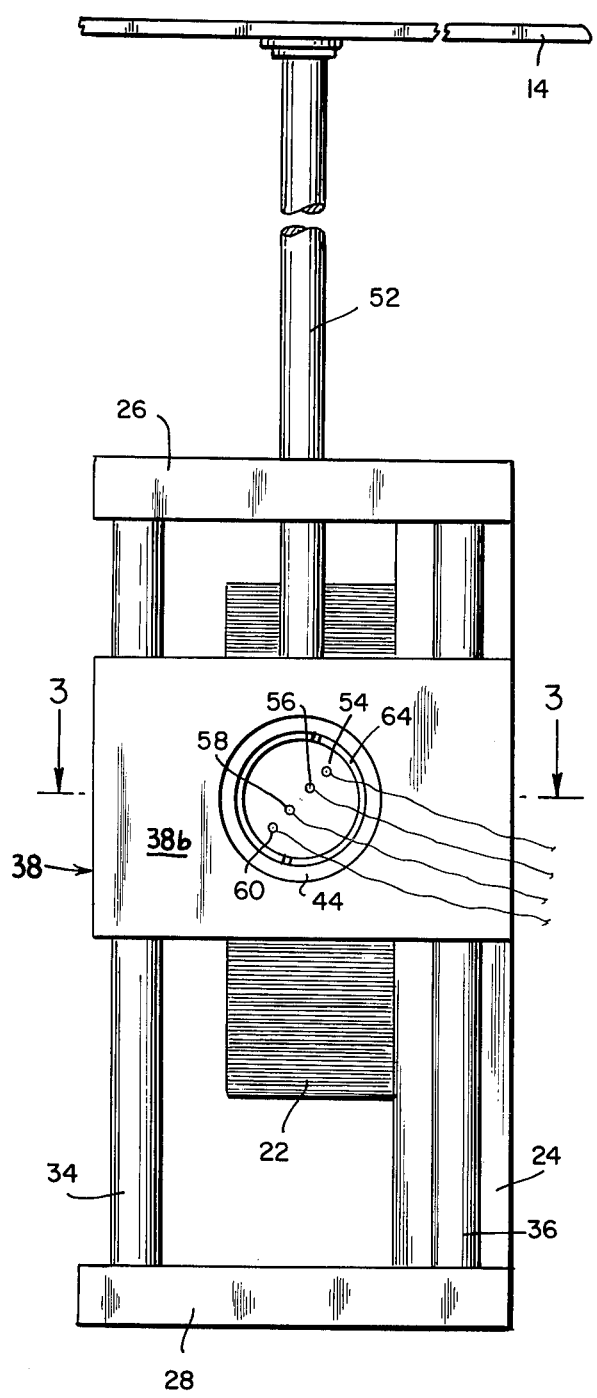
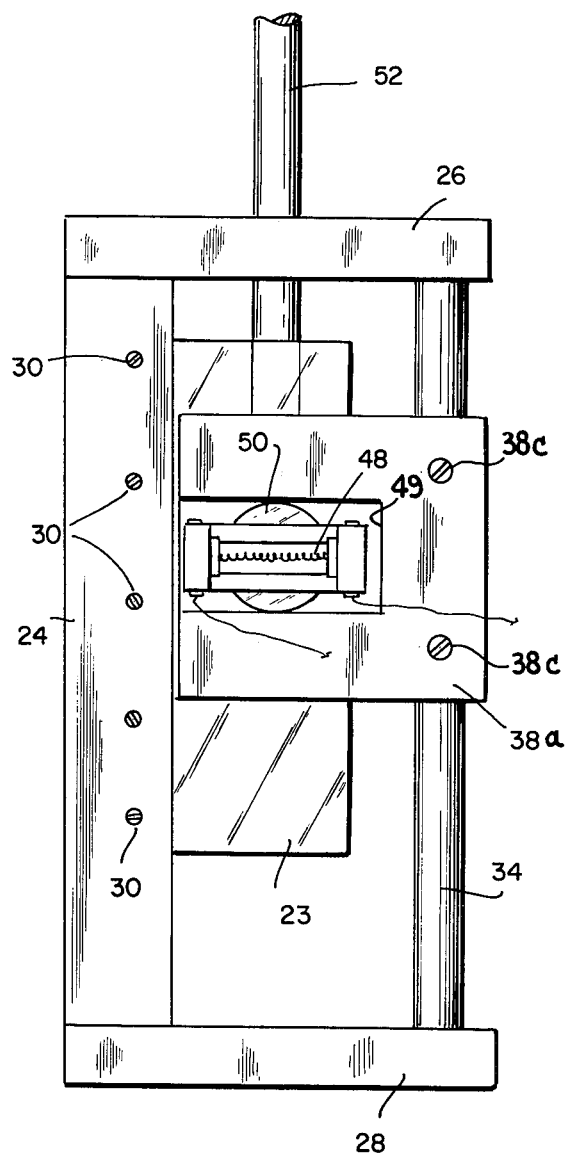

WEIGHING SYSTEM WITH A MOIRE OPTOELECTRONIC TRANSDUCER

BACKGROUND OF THE INVENTION

1. Field of the Invention

The invention relates generally to mass measuring and more particularly to a weighing system employing a Moire optical device and a readout means for the detection of scale deflection.

2. Brief Description of the Prior Art

In U.S. Pat. No. 3,861,480 a high speed automatic mail processing system for sorting and imprinting postage on large quantities of mixed mail has been described. The system employed an optical readout apparatus for detecting the deflection of the scale tare when supporting a piece of mail for the determination of the postage to be affixed thereon. This prior apparatus included a bank of multiple photodetectors at the end of a light path. A shutter, carried by the tare, was operable to gradually block the light path to successive photodetectors of the bank. A signal indicative of the number of photodetectors remaining in the light path, hence tare deflection, was produced and utilized to set the postage to be imprinted on the piece of mail.

Several disadvantages accompanied the use of this prior optical readout apparatus. For example, numerous photodetectors were required to provide weight indicative signals over a small weight load range with the amount of photodetectors increasing with increased scale capacity; furthermore, the particular transition point wherein each photodetector switched, for example, from conduction to nonconduction states had to be individually set for successive postage weight increments. These transition or switching points were highly critical and tolerance requirements rendered final adjustments difficult and time consuming.

Another disadvantage related to the relatively large projection path, e.g., 18 inches to 24 inches (45-60 cm.), which was required in order to obtain the necessary optical magnification. As a result of such a large projection path and the critical switching points, accuracy of readouts were highly sensitive to vibrations and other environmental conditions.

A similar optical detection system for weight determination is illustrated in U.S. Pat. No. 3,528,517 wherein a coded chart is moved by a load responsive lever with coded markings of the chart being projected upon a bank of photocells. Among the disadvantages of this system were the numerous photocells required for weight determination, with the transition point of each photocell being critical.

In U.S. Pat. No. 3,826,318 a movable and a stationary bar grid in optical alignment were employed. The movable grid functioned as a shutter to sequentially block a light beam through the grids. Electrical signals were generated from the sequential light pulses and were processed to provide a weight indicative signal. A significant drawback of the shutter-grid optical system was that small displacements (less than the spacings between successive bars of the grids) were practically impossible to detect.

The utilization of optical control systems employing moire fringe patterns have been suggested as measurement and control devices for machine tools. Typically, measuring devices such as those illustrated in U.S. Pat. Nos. 2,886,717; 2,886,718; 2,861,345 and 3,154,688, have been designed for utilization in tools such as milling machines in order to measure the movement of the work table of the machine with respect to the framework.

A further position detecting system utilizing moire fringe patterns is disclosed in U.S. Pat. No. 3,755,682. This system requires at least eight photoelectric cells. The output of the photocells are selected in cyclic order by scan pulses to produce a composite output signal, which is compared to a reference signal. The numerous photocells add to the complexity and cost and increase the potential for malfunction.

U.S. Pat. Nos. 3,713,139 and 3,708,681 illustrate typical moire optical devices for determining displacement, and are indicative of one of the drawbacks with prior moire displacement measuring techniques. A plurality of strip photodetectors are employed, each having a length approximating the width of the index grating. In order to synchronize the photodetector spacing with the fringe spacing, the skew angle between the gratings is adjusted to vary the fringe spacings. Unfortunately, minute adjustments in the skew angle result in substantial changes in the fringe spacing, and difficult precise skew angle adjustment is necessary to properly coordinate the fringe patterns with the photodetector spacings.

SUMMARY OF THE INVENTION

In compendium, the present invention relates to a weighing scale having an optical system for sensing tare deflection by generating a moire fringe pattern and moving the pattern as an amplified direct function of the tare deflection. The fringe pattern is generated by modulation of a light beam which projects through a pair of ruled parallel grating sets. As the tare structure of the scale is displaced under load, the accompanying deflection of one of the grating sets produces a sequential movement of successive moire fringes or bands across an array of photodetector pairs. Coarse adjustment of the synchronization between the photodetector pairs and the fringe pattern is obtained by adjustment of the skew angle between the grating sets. Fine adjustment thereof is achieved by changing the effective photodetector spacings in said array and relative to fringe pattern. A load of a given weight produces a given deflection of the tare, and the resultant linear movement of a given number of fringes past a reference, i.e., a photodetector, provides a given number of weight indicating sequential pulses suitable for processing and subsequent utilization.

From the foregoing it will be appreciated that it is an object of the present invention to provide a scale having an optial detection system of the general character described, which however is not subject to the disadvantages of the prior systems.

It is a further object of the present invention to provide a scale having an optoelectronic detection system of the general character described which is economical, simple in construction, and suitable for rapid, yet accurate weight determination.

A further object of the present invention is to provide a scale having incorporated therein a moire optical device for generating a pattern of interference fringes, and a photodetector means for sensing the movement of said fringes caused by a load being applied to the scale.

Another object of the present invention is to provide a scale having an optical detection system of the general character described, wherein a minimum number of photodetectors is required regardless of the scale weight load range.

Another object of the present invention is to provide a scale having an optical detection system of the general character described which detects tare deflection by sensing the movement of an amplified fringe pattern directly projected across a relatively short optical path.

A further object of the present invention is to provide a scale having an optical detection system of the general character described wherein fine registering adjustment between fringe phase angle spacing and photodetector spacing is achieved by varying the effective distance between photodetectors.

Other objects of the present invention in part will be obvious and in part will be pointed out hereinafter.

With these ends in view, the invention finds embodiment in certain combinations of elements and arrangements of parts by which the objects aforementioned and certain other objects are attained, all as fully described with reference to the accompanying drawings and the scope of which is more particularly pointed out and indicated in the appended claims.

BRIEF DESCRIPTION OF THE DRAWINGS

In the accompanying drawings in which is shown one of the various possible embodiments of the invention.

FIG. 2 is an enlarged front elevational view of the detection apparatus and shows a optical-electrical transducer mounted for vertical movement with the scale platform.

FIG. 4 is an enlarged rear elevational view of the detection apparatus and illustrates a vertical channel member within which the fixed grating set is clamped.

FIG. 6 is a fragmentary perspective view of photodetector carrier.

DESCRIPTION OF THE PREFERRED EMBODIMENT

Figure 1:
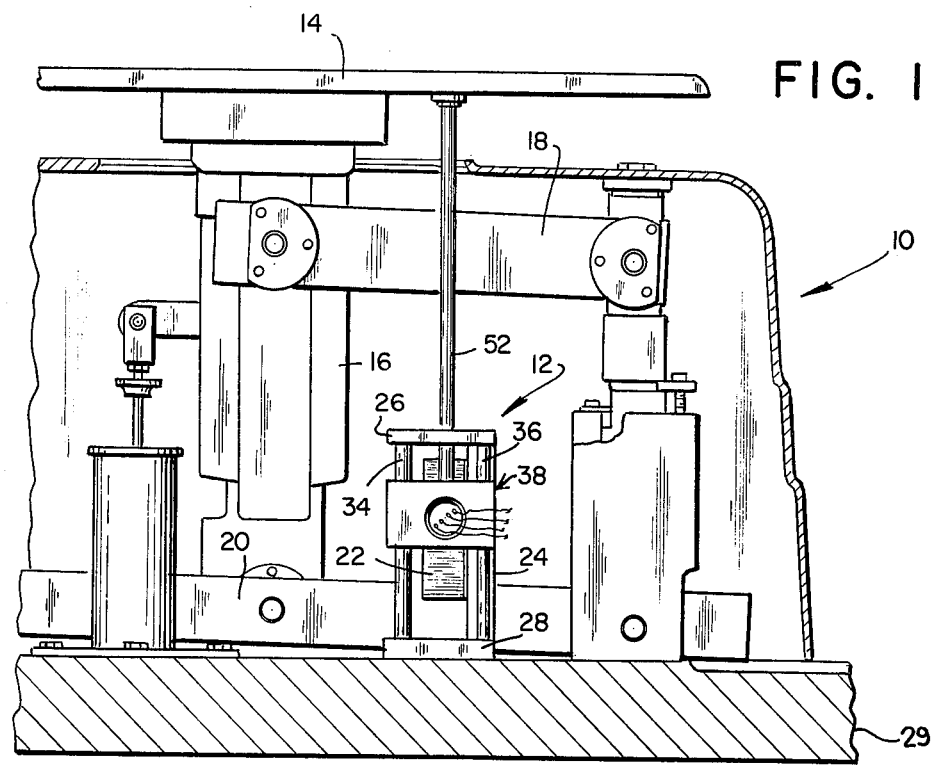
FIG. 1 is a transverse sectional view through a typical scale embodying the present invention, with non-pertinent portions thereof deleted for clarity, and illustrating an apparatus for optically detecting the application of a load to the scale platform and for generating weight indicative signals that are capable of energizing a display or other means.

Referring now in detail to the drawings wherein a typical exemplary embodiment of the invention is illustrated, the reference numeral 10 denotes generally a typical weighing scale having an optical detector 12 constructed in accordance with and embodying the invention. Except as otherwise described herein, the scale 10 may be conventional in nature as respects the construction and operation of the pertinent parts thereof and for illustrative purposes is shown here as a drum type postage scale similar to scales featured in the Pitney Bowes Inc. Series 3700 scale line. Typically included in the scale 10 is a load carrying platform or tray 14 supported by a tare plunger 16. The tray 14 is mounted for vertical movement by means of a bar linkage pivotably connected to plunger 16 and comprising parallel upper and lower pivotal links 18 and 20 respectively. It should be appreciated that the scale 10 is designed to provide substantially linear deflection of the tray 14 over the latter's operative displacement range as a result of different weights placed on the platform 14.

In accordance with the present invention, an optical detector 12 is operatively positioned within the scale housing and is operatively interconnected between the main frame of the scale and the tare so as to be mechanically controlled by movement of the tare structure whereby displacement of platform 14 resulting from a load being placed on the platform may be detected. The optical detector 12 of the present invention may find application in virtually any scale which detects weight through measurement of tare deflection.

Figure 3:
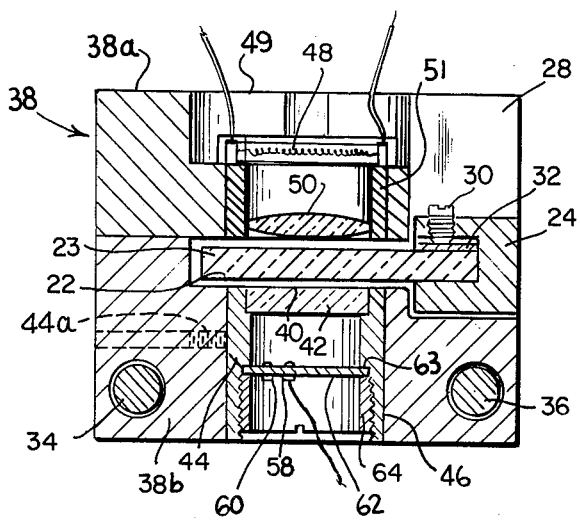
FIG. 3 is a sectional view through the transducer, the same being taken substantially along section line 3—3 of FIG. 2 and illustrates an illuminating lamp and condensing lens which provide a light beam through a pair of ruled parallel gratings on transparent substrates, one set of which is fixed with respect and the other of which is mounted to the transducer for movement therewith.

The present invention utilizes the movement of a moire fringe pattern for the detection and measurement of load weight. For this purpose, a pair of ruled parallel grating sets disposed on transparent substrates are provided, the construction and nature of each such substrate and associated grating set being well known in the moire optical art. As will be seen one of the sets, 22, is fixedly carried by the main frame of the scale while the other set 40 is carried by and moves with the tare in a plane parallel to and closely adjacent the said fixed set 22. The gratings of each set 22 and 40, respectively, may for example comprise 2000 Ronchi rulings per inch; however the density of rulings of each set may vary and need not necessarily be equal. Referring now to FIGS. 2, 3, and 4, the fixed reticle grating set 22 formed in a planar face of a transparent plate or substrate 23 (FIG. 3), made for example of glass, is mounted in a substantially vertical position within a support channel or member 24. The channel 24 is secured to and extends between upper and lower base members 26 and 28 (FIG. 1) respectively; the lower base member 28 being secured to a portion of the scale support means or main frame 29 (FIG. 1). An edge portion of the planar face of the substrate 23 abuts against a flat inner flange wall of the support channel 24 so that this substrate may be secured in a non-rotatable fixed position on said main frame by means of a plurality of clamping screws 30 (FIGS. 3 and 4) which apply clamping pressure against an abutment shim 32.

A parallel pair of vertical guide rods 34 and 36 (FIG. 3) extend between and are fixed to the upper and lower base members 26 and 28 of the detector 12, each guide rod extending parallel to the plane of substrate 23. Mounted for sliding movement on the guide rods 34 and 36 is a moire optical electrical transducer unit 38 that includes a housing comprised of two parts 38a, 38b (FIG. 3) that are secured together by any suitable means such as screws illustrated at 38c of FIG. 4. The transducer housing is formed with a pair of parallel vertical bores for sliding engagement with the said rods 34 and 36 whereby the path of travel of the movable grating set 40 will be maintained in precisely parallel orientation with respect to the fixed or reticle grating set 22. The transducer housing is formed with a cylindrical bore 46 which extends through said housing and which has an axis that is disposed perpendicular to the plane of said grating set 22. Disposed within said bore is a tubular sleeve 44, to the inner end of which is secured a disc shaped substrate 42 made for example of glass and on which is disposed said grating set 40. In order to adjust the distance between the grating sets and the spacings between the fringes of the moire interference pattern, the sleeve 44 is adjustably secured in bore 46 by any suitable conventional means, such as set screw 44a, for both axial and angular adjustment in said bore.

To provide a light beam for modulation by the said grating sets, the bore 46 communicates with an enlarged rectangular area 49 (FIGS. 3 and 4) formed in said housing section 38a. A suitable lamp, indicated at 48, is mounted by any conventional means within said opening 49 so as to provide a light source for the instant moire optical system. A condensing lens 50 is secured in an annular member 51 (FIG. 3) which in turn is fixedly mounted in said bore 46 in a position between the lamp 48 and the fixed reticle grating set 22 so as to project a concentrated light beam from light source 48 through the grating sets 22 and 40. The sleeve 44 is axially and rotatably adjusted and secured in a position in said bore 46 such that the gratings of the movable grating set 40 are positioned at a slight skew angle with respect to the gratings of the fixed or reticle grating set 22 and so that the optical interference between the two grating sets modulates the light beam into parallel moire fringes as is well understood in the art of moire optics.

The placement of a load on the scale platform 14 causes the transducer unit 38, and hence the movable substrate 42 and grating set 40, to move in a downward direction as seen in FIG. 1. This downward movement is achieved and controlled through an actuating rod 52 which is secured by any suitable means to and extends upwardly from the transducer unit 38; the distal or upper end of the rod 52 being secured by any suitable means to the underside of the tray 14 so as to accommodate and follow movement of the latter. It should be appreciated that the weight of the transducer unit 38 and the actuating rod 52 constitute a preload condition or part of the tare structure of the scale 10.

With the gratings of the fixed reticle grating set 22 oriented in a substantially horizontal position, the downward movement of the transducer unit 38, and hence the downward movement of the grating set 40, results in substantially horizontal movement of successive substantially vertically extending moire fringes. The fringe movement is detected and counted in accordance with the present invention to provide a signal indicative of the load weight placed on the platform 14. The movement of the moire interference pattern is sensed by a plurality of photodetectors 54, 56, 58, 60 (FIG. 2). These photodetectors are each conventional in nature and are mounted on a nonconducting disc 62, (FIG. 6); each photoconductor being equidistantly spaced from one another and disposed in linear array along a positional axis that is coincident with a diameter of said disc. The disc 62 is mounted within the inner bore of the sleeve 44 in abutment against an internal sleeve stop shoulder 63 and is secured in a desired rotationally adjusted position relative to the sleeve by means of a clamping collar 64 that threadedly engages the inner surfaces of the outer end of said sleeve 44. Although four photodetectors have been illustrated, satisfactory results have been obtained utilizing two photodetectors which sense both the magnitude and direction of movement of the moire fringe pattern. For the sake of clarity of illustration the disc 62 is shown in FIG. 3 as spaced a considerable distance from the plate or substrate 42, in practice however the disc is disposed axially close to said substrate 42 for the purpose of maximizing resolution.

Figure 5:
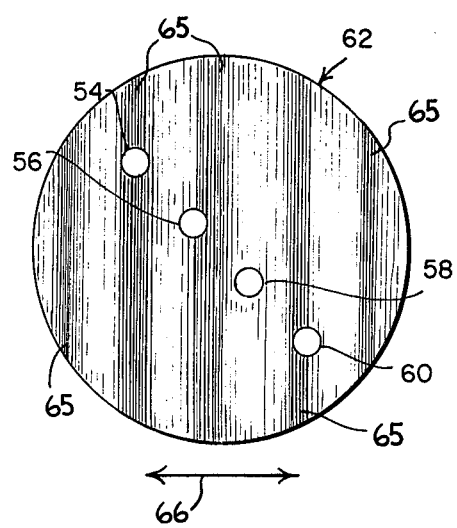
FIG. 5 is an enlarged diagrammatic type view illustrating the moire fringe pattern as projected on an array of photodetectors mounted to a rotatable disc in the transducer.

It should be appreciated that each of the photodetectors 54, 56, 58 and 60 is optimally placed effectively 90° apart from each adjacent photodetector as measured with respect to the cyclic moire interference pattern which moves across the photodetector array, this positional relationship being illustrated in FIG. 5 wherein the moire fringes or lines are indicated at 65 and wherein the photodetectors 54, 56, 58 and 60, diagrammatically illustrated by small circles, are mounted on said disc 62 in the linear array shown. As illustrated in FIG. 5 when detector 54 "sees" the center of a moire fringe line, detectors 56 and 60 see opposite side edge of other of such lines while detector 58 see the center of a light space between such lines. The photodetectors 54 and 58 are electrically interconnected and arranged to provide a single output signal while the photodetectors 56 and 60 are similarly arranged to provide a single output signal. Each interconnected pair of photodetectors is spaced 90° from each other as measured with respect to the cyclic fringe pattern so that the combined output signal of each pair is in phase quatrature with respect to the other pair.

In order to accurately correlate or synchronize the spacings between the photodetectors with spacings between the moire fringes, extensive and very precise adjustment of the skew angle between the respective grating sets was heretofore necessary in the attempt to vary the fringe spacings to match the photodetector spacings. Considerable difficulty was experienced here because most often small skew angle changes between gratings resulted in disproportionate fringe spacing changes. In accordance with the present invention, fine adjustment to synchronize and coordinate photodetector spacing with fringe spacing is achieved by varying the effective spacings between photodetectors so as to match the fringe spacings. The instant photodetector spacing may be easily varied by rotatively adjusting the position of the disc 62 in the sleeve 44 and locking the disc in selected position by tightening the collar 64. In order to take advantage of this space adjusting technique each photodetector 54, 56, 58 and 60 has a maximum transverse of diametral dimension not greater than the thickness of a fringe band or line. This condition affords a very beneficial result, namely that even if the axis of any individual one of the said photodetectors is not exactly perpendicular to fringe pattern movement the rotative adjustment of disc 62 will not result in inaccurate optical readings.

With reference to FIG. 5, the fine adjustment of photodetector spacing with respect to fringe spacing will be described in more detail. Assuming, for example, that the spacing between successive moire fringes shown is too large for the photodetector spacing, fine adjustment compensation for such larger fringe pattern spacing could be achieved by rotating the disc 62 in a counterclockwise direction relative to fringe lines 65, thereby increasing the effective distance between the photodetectors with respect to said fringe lines; movement of the latter being in a substantially horizontal direction as indicated at 66 in FIG. 5. The output signals of the said photodetector pairs are subsequently processed utilizing circuitry well known in the art, which specific circuitry may, for example, be similar to that shown in U.S. Pat. Nos. 2,886,718 or 3,713,139. By use of such circuitry the fringes moving past the photodetectors are counted to provide a signal indicative of the weight of the load placed on the scale platform 14. Such a weight indicative signal may be utilized to control a weight display device, apparatus for imprinting the weight of the load, and/or calculating the price of the latter. When a piece of mail is to be weighed such a signal may be used for calculating the amount of postage required.

It will be seen that there is provided a novel and efficient weight measuring system which incorporates a moire optical device in a scale displacement detector so as to achieve the various objects of the invention, and which is well suited to meet the conditions of practical use.

As various changes might be made in the weight measuring system as above set forth, it is to be understood that all matter herein described or shown in the accompanying drawings is to be interpreted as illustrative and not in a limiting sense.

Having described the invention, there is claimed as new and desired to be secured by Letters Patent:

1. A weighing scale having a frame, a displaceable tare structure carried by said frame, said tare structure being yieldably displaceable in accordance with the mass of a load being weighed, and an optical detector system for determining the extent of tare structure displacement: said optical detector system comprising
    means for providing a light beam;
    a pair of grating sets, each of said grating sets having an optical grating, one of said grating sets being mounted on said frame, and the other of said grating sets being mounted so as to move with said tare structure and relative to said one of said grating sets;
    said pair of optical grating sets being mutually angularly oriented so that said two optical gratings are positioned at an angle with respect to one another and modulate said light beam so as to generate a pattern of moire optical interference fringe lines, movement of the grating set that moves with said tare structure causing transverse movement of said fringe lines; and
    photodetector means adapted to be aligned with said transverse fringe movement for detecting movement of said fringe lines produced by the displacement of said tare structure.

2. Apparatus as defined by claim 1; additionally comprising means for adjusting the relative angular positions of said grating sets.

3. Apparatus as defined by claim 2 wherein the grating set that moves with said tare structure is mounted for rotative adjustment relative to the said grating set that is mounted on said frame.

4. Apparatus as defined by claim 1; additionally comprising means for rotatably adjusting said photodetector means relative to said moire pattern of interference fringe lines.

5. Apparatus as defined by claim 4 wherein said photodetector means is mounted so as to move with said tare structure.

6. Apparatus as defined by claim 5 wherein the optical grating set that moves with said tare structure is angularly adjustable relative to the said grating set mounted on said frame.

7. Apparatus as defined by claim 4 wherein said photodetector means includes a plurality of spaced and aligned photodetectors.

8. Apparatus as defined by claim 7 wherein said photodetector means is mounted so as to move with said tare structure.

9. Apparatus as defined by claim 1 wherein said optical detector system includes means for counting said fringe lines during said movement of the latter and for generating signals indicative of the weight of an object being weighed by the scale.

* * * * *